United States Patent
DeLanoy et al.

(10) Patent No.: US 9,365,133 B2
(45) Date of Patent: Jun. 14, 2016

(54) CLOSE OUT BRACKET

(71) Applicant: Toyota Motor Engineering & Manufacturing North America, Inc., Erlanger, KY (US)

(72) Inventors: Trevor J. DeLanoy, Howell, MI (US); Robert C. Day, Whitmore Lake, MI (US); Vasudeva S. Murthy, Ann Arbor, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 41 days.

(21) Appl. No.: 13/719,668

(22) Filed: Dec. 19, 2012

(65) Prior Publication Data

US 2014/0166842 A1 Jun. 19, 2014

(51) Int. Cl.
*B60N 2/015* (2006.01)

(52) U.S. Cl.
CPC .............. *B60N 2/0155* (2013.01); *B60N 2/015* (2013.01); *B60N 2/01516* (2013.01); *B60N 2/01525* (2013.01)

(58) Field of Classification Search
CPC .............. B60N 2/015; B60N 2/01508; B60N 2/01516; B60N 2/01525; B60N 2/01541; B60N 2/0155; B60N 2/01558; B60N 2/01566; B60N 2/01575
USPC .............. 248/300, 429, 424, 346.01, 346.06, 248/499, 500, 501, 503, 503.1; 244/118.5, 244/118.6, 122 R, 129.1, 131; 296/65.03
See application file for complete search history.

(56) References Cited

U.S. PATENT DOCUMENTS

| | | | | |
|---|---|---|---|---|
| 4,055,320 A | * | 10/1977 | Bengtsson | 248/501 |
| 4,595,164 A | * | 6/1986 | Froutzis et al. | 248/429 |
| 4,638,546 A | * | 1/1987 | Benshoof | B60N 2/015 |
| | | | | 29/525.11 |
| 4,901,968 A | | 2/1990 | Ellis et al. | |
| 5,104,176 A | | 4/1992 | Mrozowski | |
| 5,188,329 A | * | 2/1993 | Takahara | 248/430 |
| 5,209,447 A | * | 5/1993 | Yokota | 248/429 |
| 5,520,357 A | * | 5/1996 | Payne et al. | 244/118.1 |
| 5,823,724 A | * | 10/1998 | Lee | B60P 7/0815 |
| | | | | 410/104 |
| 6,047,940 A | * | 4/2000 | Kaplan | 248/501 |
| 6,427,962 B1 | * | 8/2002 | Rohee et al. | 248/424 |
| 6,655,739 B2 | * | 12/2003 | Furukawa | 297/344.11 |
| 7,073,839 B2 | | 7/2006 | Boyina et al. | |
| 7,281,696 B2 | * | 10/2007 | Kida | B60J 5/06 |
| | | | | 248/300 |
| 7,399,149 B2 | * | 7/2008 | Kinoshita | B60N 2/0705 |
| | | | | 410/115 |
| 7,566,086 B2 | * | 7/2009 | Gray et al. | 296/65.13 |
| 7,658,357 B2 | * | 2/2010 | Babian | 248/309.1 |
| 7,984,534 B2 | * | 7/2011 | Duggan | F16G 11/00 |
| | | | | 24/115 K |
| 8,162,373 B2 | * | 4/2012 | Cao | B60N 2/0722 |
| | | | | 248/345.1 |

(Continued)

*Primary Examiner* — Jonathan Liu
*Assistant Examiner* — Guang H Guan
(74) *Attorney, Agent, or Firm* — Dinsmore & Shohl LLP

(57) ABSTRACT

The present invention relates to a close out bracket for securing a seat mounting structure to a support rail in a floor of a vehicle. The bracket has a generally flat center portion that is rigidly engaged between the seat mounting structure and the support rail. The bracket also has a curved portion extending radially outward from the center portion. The curved portion has a generally inverted U shape and extends along the perimeter of the center portion. The bracket serves as a finish trim piece by closing out along the edge of the floor covering that was cut to expose the support rail below.

16 Claims, 2 Drawing Sheets

(56) References Cited

U.S. PATENT DOCUMENTS

| | | | | |
|---|---|---|---|---|
| 8,313,149 | B2* | 11/2012 | Miyazaki | B60N 2/0725 297/463.1 |
| 2002/0056799 | A1* | 5/2002 | Fujimoto | B60N 2/071 248/430 |
| 2010/0213752 | A1* | 8/2010 | Miyazaki et al. | 297/463.1 |
| 2010/0320795 | A1* | 12/2010 | Cao et al. | 296/65.13 |
| 2014/0166842 | A1* | 6/2014 | DeLanoy | B60N 2/015 248/503.1 |

* cited by examiner

CLOSE OUT BRACKET

FIELD OF THE INVENTION

The present invention relates to a close out bracket for a motor vehicle, and in particular to a bracket for securing a seat mounting structure to a support rail in a floor of a vehicle.

BACKGROUND OF THE INVENTION

Vehicle seats are often mounted within a vehicle cabin by securing the seat to the vehicle floor. The mounting structure of the seat may be secured to the floor of the vehicle using bolts, fasteners, or other known affixing means. The manner in which the seat mounting structure is secured to the vehicle must be resilient enough to keep the seat stationary in the event of a collision. As such, brackets used in mounting vehicle seats must be able to endure a significant load.

Many vehicles also contain seats where the bottom cushion may be moved into a storage position. These seats are commonly referred to as "flip-up seats." A primary goal of flip-up seats is to increase the utility or accessibility of the vehicle by providing access to the portion of the vehicle floor normally covered by the bottom cushion. Accordingly, the seat mounting structure and brackets used to secure the seat to the vehicle floor must be designed to endure the regular wear and tear of a vehicle cargo floor. Furthermore, to maximize the utility of the vehicle floor, the brackets should be as unobtrusive as possible and prevent objects placed on the cargo floor from becoming snagged or damaged by the mounting bolts.

Vehicle floors are often finished with a carpet or other floor covering. The carpet is generally cut around the support rail to allow the seat mounting structure to be affixed directly to the support rail. Accordingly, it would be aesthetically beneficial for the bracket to close out the cut carpet around the support rail. In this way, the bracket could serve as a finish trim piece in addition to its other functional capabilities.

SUMMARY OF THE INVENTION

The present invention relates to a close out bracket for mounting a seat mounting structure to a floor of a vehicle. Additionally included is a support rail within the floor, a carpet covering the floor, and fastening means such as bolts to secure the seat assembly to the support rail.

The bracket may be formed of metal, plastic, or any other suitable material used in the manufacture of vehicle parts. The bracket has a generally flat center portion that is rigidly engaged between the seat mounting structure and the support rail.

The bracket also has a curved portion extending radially outward from the center portion. The curved portion has a generally inverted U shape and extends along the perimeter of the center portion. The curved portion helps the bracket bear the load between the seat and the floor of the vehicle by increasing the torsional rigidity of the bracket. The curved portion also prevents objects placed on the floor of the vehicle from becoming damaged by the heads of the mounting bolts located in the center portion by extending vertically upwards from the center portion a distance greater than the thickness of the head of the bolts.

The curved portion also enables the bracket to serve as a finish trim piece by closing out along the edge of the carpet that was cut to expose the support rail below. The curved portion extends outward over the edge of the carpet and then curves downward so as to contact the carpet perpendicularly. When the bracket is affixed between the seat mounting structure and the support rail, the curved portion engages the carpet beyond the cut edge. In this way, the bracket improves the aesthetics of the vehicle by providing a clean finished look while also serving a functional purpose as a load bearing member of the seat assembly.

BRIEF DESCRIPTION OF THE DRAWINGS

A better understanding of the present invention will be had upon reference to the following detailed description when read in conjunction with the accompanying drawings, wherein like reference characters refer to like parts throughout the several views and in which.

DETAILED DESCRIPTION OF A PREFERRED EMBODIMENT OF THE PRESENT INVENTION

Figure 1:
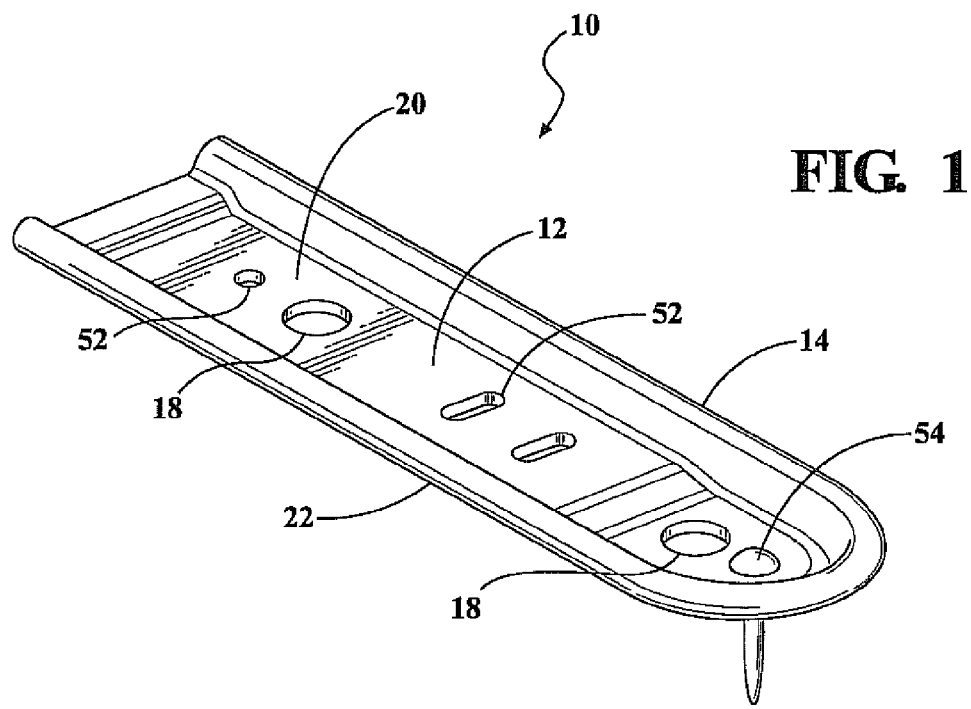
FIG. 1 is a view of a close out bracket for a vehicle seat.

With reference first to FIG. 1, a close out bracket 10 for mounting a vehicle seat mounting structure 16 to a vehicle floor 40 is provided. The bracket 10 includes a generally flat center portion 12, a curved portion 14 extending around a perimeter of the center portion 12, and a plurality of mounting holes 18 in the center portion 12. When mounted to the floor of a vehicle, the bracket 10 serves to rigidly secure the seat mounting structure 16 to the vehicle floor 40 while further serving as a finish trim piece to improve the aesthetics of the vehicle floor 40.

The curved portion 14 extends around a substantial perimeter of the center portion 12 and has a generally inverted U shape. In one aspect, the curved portion 14 increases the torsional rigidity of the bracket 10 to more stably secure the seat mounting structure 16 to the vehicle floor 40. The curved portion 14 also serves an aesthetic purpose and closes out a cut edge 42 of the floor covering 44 around the support rail 30. The curved portion 14 finally prevents objects placed on the vehicle floor 40 from contacting the mounting bolts 50 by extending upwards from the vehicle floor 40 a distance greater than the thickness of the head of the mounting bolts 50.

The bracket 10 has a top side 20 and a bottom side 22 which are together engaged between the support rail 30 and the seat mounting structure 16 by the mounting bolts 50. In addition, it is appreciated from FIG. 2 that the bracket 10 is located entirely above the support rail 30. The top side 20 of the bracket 10 receives the seat mounting structure 16 and contains indexing features 52 complementary to those on the seat mounting structure 16 to aid in aligning the bracket 10 with the seat mounting structure 16. The bottom side 22 of the bracket 10 engages the support rail 30 and the floor of the vehicle and likewise contains indexing features 52 to aid in aligning the bracket 10 with the support rail 30. The bracket 10 may also contain locating pins 54 to align the bracket 10 with the seat mounting structure 16 or the support rail 30.

The center portion 12 of the bracket 10 has through holes for receiving mounting bolts 50 such that the center portion 12 is sandwiched between the seat mounting structure 16 and the support rail 30, and to secure the seat mounting structure 16 and the bracket 10 to the support rail 30 in the vehicle floor 40. The plurality of mounting holes 18 are preferably placed at distal ends of the center portion 12 of the bracket 10. Maximizing the distance between the plurality of mounting holes 18 increases the amount of load that the bracket 10 can bear in extreme conditions, for example when the vehicle sustains a rear impact. The relatively low profile of the bracket 10 allows for the distance between the mounting bolts 50 to be increased without unduly increasing the size of the seat mounting structure 16 which would in turn decrease the amount of space available on the vehicle floor 40 when the seat is flipped up.

Figure 2:
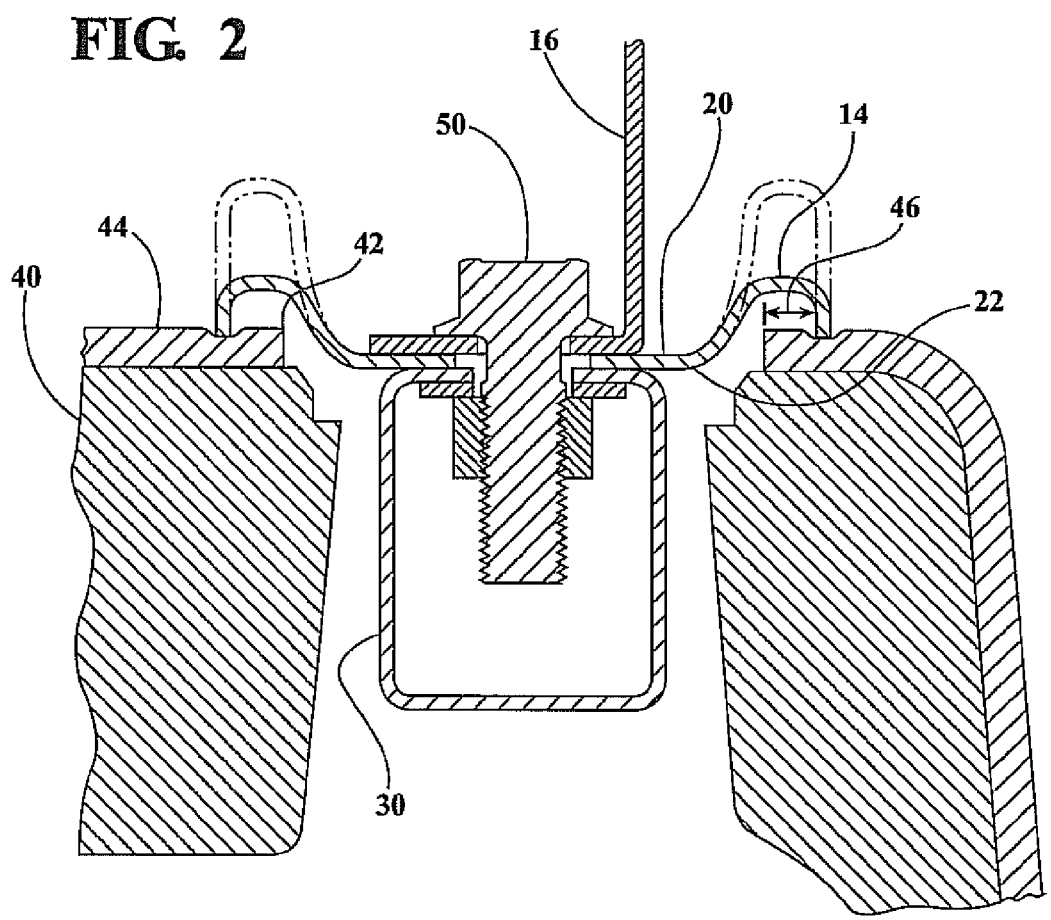
FIG. 2 is a cross sectional end view of the bracket, the support rail, and the carpeted vehicle floor.
Figure 3:
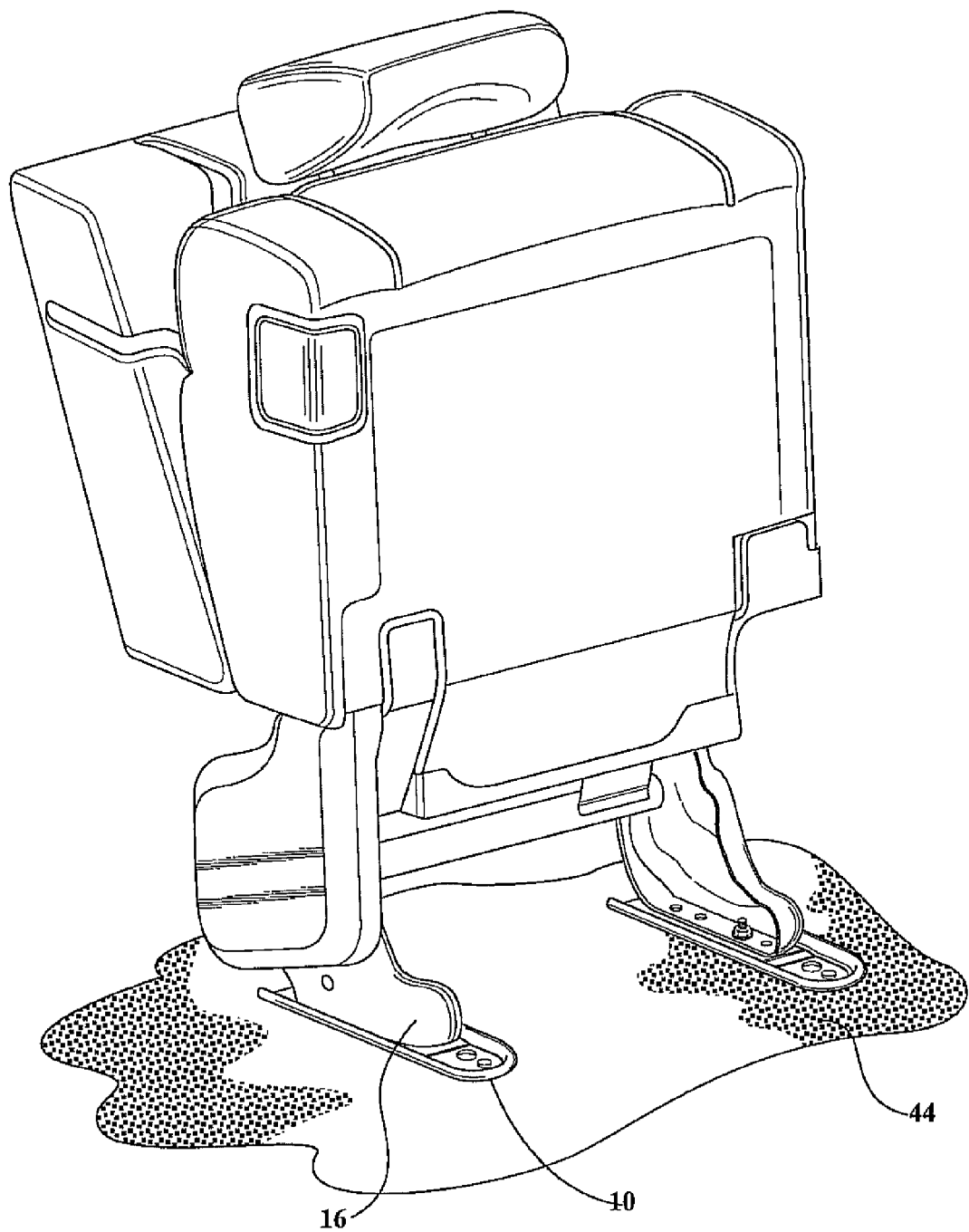
FIG. 3 is a view of a flip-up seat assembly including the close out bracket.

The bracket 10, support rail 30, and vehicle floor 40 are shown in cross section in FIG. 2. The bracket 10 and seat mounting structure 16 are secured to the support rail 30, here using a mounting bolt 50. However, other known affixing means such as welding may be used to secure the bracket 10 to the support rail 30. The bottom side 22 of the center portion 12 engages the support rail 30. The support rail 30 resides in a hole in the vehicle floor 40 and finish vehicle floor 40 coverings such as carpet are often cut around the hole in the vehicle floor 40 so that the bracket 10 and seat mounting structure 16 may be mounted directly to the support rail 30. The curved portion 14 of the bracket 10 serves to close out the cut edge 42 of the floor covering 44 around the hole in the vehicle floor 40 to provide a finished and aesthetically pleasing look.

The curved portion 14 has a generally inverted U shape extending outwards from the center portion 12 of the bracket 10 along a substantial periphery of the bracket 10. The curved portion 14 extends outward from the center portion 12 beyond the cut edge 42 of the vehicle floor 40 covering and then curves downward to engage the floor covering 44 beyond the cut edge 42. The amount that the curved portion 14 extends outward over the cut edge 42 of the floor covering 44 allows the bracket 10 to compensate for inconsistencies with the floor covering 44 placement as well as location of the cut edge 42 in relation to the support rail 30. As such, the bracket 10 provides more tolerance for this portion of vehicle assembly while still providing an aesthetically pleasing finished look.

The width of the curved portion 14 may be changed to adjust the close out area 46 of the bracket 10 while the height of the curved portion 14 may be adjusted as shown by the dotted lines in FIG. 2 and to increase the torsional rigidity of the bracket 10. The height of the curved portion 14 may also be adjusted in accordance with the thickness of the head of the mounting bolt so as to ensure that the head of the mounting bolt is recessed below the top edge of the curved portion 14.

From the foregoing it can be seen that the present invention provides a close out bracket 10 for mounting a seat mounting structure 16 to a support rail 30 in a vehicle floor 40. The bracket 10 increases the usable area of the vehicle floor 40 while serving as a finish trim piece to cleanly close out the floor covering 44 around a hole in the vehicle floor 40. Having described the invention, however, many modifications thereto will become apparent to those skilled in the art to which it pertains without deviation from the spirit of the invention as defined by the scope of the appended claims.

The invention claimed is:

1. An assembly for mounting a seat to a vehicle, the assembly comprising:
   a floor;
   a carpet covering the floor;
   a rail mounted in the floor;
   a seat mounting structure configured to be fixedly attached on a base of the seat;
   a bracket having a top side, a bottom side and a body, the top side and the bottom side located between the rail and the seat mounting structure such that the bracket is located entirely above the rail, the bracket having a peripheral edge extending around a center portion, the center portion fixedly attached to a bottom of the seat mounting structure and the rail, the bracket further having a curved portion extending along a length of the peripheral edge over an edge portion of the carpet, the curved portion having a generally inverted U shape and including a first portion extending upward from the center portion, a second portion extending downward to a distal edge, the distal edge of the curved portion engaging the carpet, and a top surface that extends on a plane about a length of the curved portion; and
   a mounting bolt extending through the seat mounting structure, the rail and the center portion of the bracket, wherein the center portion is sandwiched between the seat mounting structure and the rail.

2. The assembly of claim 1, wherein a head of the mounting bolt has a thickness that extends upward from the center portion; and wherein the first portion extends upward from the center portion such that a distance between the top surface and the center portion is greater than the thickness of the head of the mounting bolt.

3. The assembly of claim 1, wherein the distal edge of the curved portion perpendicularly engages the carpet.

4. The assembly of claim 1, further comprising at least one through hole in the center portion, the at least one through hole receiving the mounting bolt.

5. The assembly of claim 1, wherein the peripheral edge of the center portion has a curved end.

6. The assembly of claim 1, wherein the first portion extends upward from the center portion away from the floor.

7. The assembly of claim 1, wherein the curved portion extends outward over and engages a close out portion of the carpet;
   the close out portion is radially outward from the center portion; and
   the close out portion has a greater surface area of the carpet than the edge portion.

8. The assembly of claim 1, further comprising at least one locating pin extending from the center portion into the rail, the locating pin locating the bracket on the rail.

9. A seat assembly for a vehicle, the seat assembly comprising:
   a seat;
   a floor;
   a carpet covering the floor;
   a rail mounted in the floor;
   a seat mounting structure fixedly attached on a base of the seat;
   a bracket having a top side, a bottom side and a body, the top side and the bottom side located between the rail and the seat mounting structure such that the bracket is located entirely above the rail, the bracket having a peripheral edge extending around a center portion, the center portion fixedly attached to a bottom of the seat mounting structure and the rail, the bracket further having a curved portion extending along a length of the peripheral edge over an edge portion of the carpet, the curved portion having a generally inverted U shape and including a first portion extending upward from the center portion, a second portion extending downward to a distal edge, the distal edge of the curved portion engaging the carpet, and a top surface that extends on a plane about a length of the curved portion; and
   a mounting bolt extending through the seat mounting structure, the rail and the center portion of the bracket, wherein the center portion is sandwiched between the seat mounting structure and the rail.

10. The seat assembly of claim 9, wherein a head of the mounting bolt has a thickness that extends upward from the center portion; and wherein the first portion extends upward from the center portion such that a distance between the top surface and the center portion is greater than the thickness of the head of the mounting bolt.

11. The seat assembly of claim 9, wherein the distal edge of the curved portion perpendicularly engages the carpet.

12. The seat assembly of claim 9, further comprising at least one through hole in the center portion, the at least one through hole receiving the mounting bolt.

13. The seat assembly of claim 9, wherein the peripheral edge of the center portion has a curved end.

14. The seat assembly of claim 9, wherein the first portion extends upward from the center portion away from the floor.

15. The seat assembly of claim 9, wherein the curved portion extending outward over and engaging a close out portion of the carpet;
   the close out portion is radially outward from the center portion; and
   the close out portion has a greater surface area of the carpet than the edge portion.

16. The seat assembly of claim 9, further comprising at least one locating pin extending from the center portion into the rail, the locating pin locating the bracket on the rail.

* * * * *